United States Patent
Teramoto (10) Patent No.: US 10,215,912 B2
(45) Date of Patent: Feb. 26, 2019

(54) LIGHT SOURCE APPARATUS AND DISPLAY

(71) Applicant: Mitsubishi Electric Corporation, Tokyo (JP)

(72) Inventor: Hiroshi Teramoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/851,814

(22) Filed: Dec. 22, 2017

(65) Prior Publication Data

US 2018/0180800 A1 Jun. 28, 2018

(30) Foreign Application Priority Data

Dec. 26, 2016 (JP) ................................ 2016-250966

(51) Int. Cl.
*F21V 7/04* (2006.01)
*F21V 8/00* (2006.01)

(52) U.S. Cl.
CPC ......... *G02B 6/0093* (2013.01); *G02B 6/0055* (2013.01); *G02B 6/0088* (2013.01)

(58) Field of Classification Search
CPC ... G02B 6/0093; G02B 6/0088; G02B 6/0055
See application file for complete search history.

(56) References Cited

U.S. PATENT DOCUMENTS 7,697,090 B2 4/2010 Shimizu
9,817,179 B2* 11/2017 Azuma ............. G02F 1/133308
9,841,553 B2* 12/2017 Kim .................... G02B 6/0088

FOREIGN PATENT DOCUMENTS

JP 2008-305576 A 12/2008
JP 2009-187728 A 8/2009
JP 2016-021356 A 2/2016

* cited by examiner

*Primary Examiner* — Ali Alavi
(74) *Attorney, Agent, or Firm* — Studebaker & Brackett PC (57) ABSTRACT

A light source apparatus includes a light source, a light guide plate, a plurality of optical sheets, and an adhesive material. The light guide plate has an incident surface on which light from the light source is incident, and a light emitting surface from which the light on the incident surface is emitted. The plurality of optical sheets are disposed to overlap one another on the light emitting surface. The adhesive material fixes positions of the plurality of optical sheets. The plurality of optical sheets include respective extension portions each formed by bending an extension of a peripheral portion of the optical sheet to face a side surface of the light guide plate. The respective extension portions are aligned with displacements so as not to completely overlap one another, and the adhesive material is applied to the respective extension portions.

10 Claims, 11 Drawing Sheets

LIGHT SOURCE APPARATUS AND DISPLAY

BACKGROUND OF THE INVENTION

Field of the Invention

The present invention relates to a light source apparatus and to a display including the light source apparatus.

Description of the Background Art

General liquid-crystal displays each include a liquid-crystal display panel, a light source apparatus, and a frame. The liquid-crystal display panel includes a pair of substrates sandwiching liquid crystals, and two polarizers provided to sandwich the pair of substrates. The liquid-crystal display panel displays an image using light emitted by the light source apparatus. The frame engages the light source apparatus in the liquid-crystal display panel.

The light source apparatus includes a light source, a light guide plate, optical sheets, a light reflection sheet, and a rear frame. The light guide plate emits, from the light emitting surface, the light incident from the light source as planar light. The optical sheets are disposed closer to the light emitting surface of the light guide plate, and control the light from the light guide plate by, for example, diffusing the light. The light reflection sheet is disposed closer to an opposite light emitting surface opposite to the light emitting surface of the light guide plate, and allows the light emitted from the opposite light emitting surface to enter the light guide plate again. The rear frame holds these components.

The light source apparatus includes a plurality of optical sheets to obtain desired brightness and viewing angle in a display such as a liquid-crystal display. The plurality of optical sheets need to be disposed in the proper order.

The rear frame of the light source apparatus is a metallic casing, and the optical components such as the optical sheets are made of resins. The displays have been designed in consideration of the dimensions of metals and resins that are of different materials in expansion and contraction to maintain the display quality in operation over a wide range of temperatures for on-board application or for industrial application. Thus, the displays have sufficient clearance. Thus, misalignment of the optical sheets caused by this clearance may be problematic.

Thus, the misalignment of the optical sheets have conventionally been prevented by partly cutting out peripheral portions of the respective optical sheets located outside of an effective light-emitting region of the light source apparatus to be exposed stepwise and then applying a tape to these exposed portions.

Japanese Patent Application Laid-Open No. 2009-187728 and Japanese Patent Application Laid-Open No. 2008-305576 each disclose a structure for addressing the misalignment of optical sheets in a display. In the structure of Japanese Patent Application Laid-Open No. 2009-187728, a planar end portion of the light guide plate includes protrusions closer to the optical sheets, and the optical sheets include depressions engaged in these protrusions. In the structure of Japanese Patent Application Laid-Open No. 2008-305576, side surfaces of the light guide plate include rectangular notches in which bent portions of the optical sheets are inserted. A casing for holding the light guide plate includes protrusions engaged in the notches of the light guide plate. The notches and the casing sandwich the bent portions of the optical sheets.

However, since the outer periphery of the display with such a structure requires space to form the protruding structure or the notch structure of the light guide plate outside the effective light-emitting region of the light source apparatus, it is difficult to narrow the bezel of the light source apparatus.

SUMMARY

The object of the invention is to provide a light source apparatus and a display including the light source apparatus which can prevent misalignment of optical sheets and narrow the bezel.

The light source apparatus according to this invention includes: a light source; a light guide plate having an incident surface on which light emitted from the light source is incident, and a light emitting surface from which the light incident on the incident surface is emitted; a plurality of optical sheets disposed to overlap one another on the light emitting surface, the plurality of optical sheets optically acting on the light emitted from the light emitting surface; and an adhesive material for fixing positions of the plurality of optical sheets. The plurality of optical sheets include respective extension portions each formed by bending an extension of a peripheral portion of the optical sheet to face a side surface of the light guide plate, the respective extension portions of the plurality of optical sheets are aligned with displacements so as not to completely overlap one another, and the adhesive material is applied to the respective extension portions.

According to the present invention, the adhesive material is applied to the respective extension portions formed by bending extensions of the peripheral portions of the plurality of optical sheets to face the side surface of the light guide plate to fix the positions of the plurality of optical sheets. Thus, misalignment of the plurality of optical sheets can be prevented. The bezel of the light source apparatus can be narrower than when the plurality of optical sheets are fixed by being engaged in the protruding structure or the notch structure of the light guide plate or by taping the top surface of the light guide plate.

DESCRIPTION OF THE PREFERRED EMBODIMENTS

Embodiments according to the present invention will be described with reference to the drawings.

Embodiment 1

Structure of Display

Figure 1:
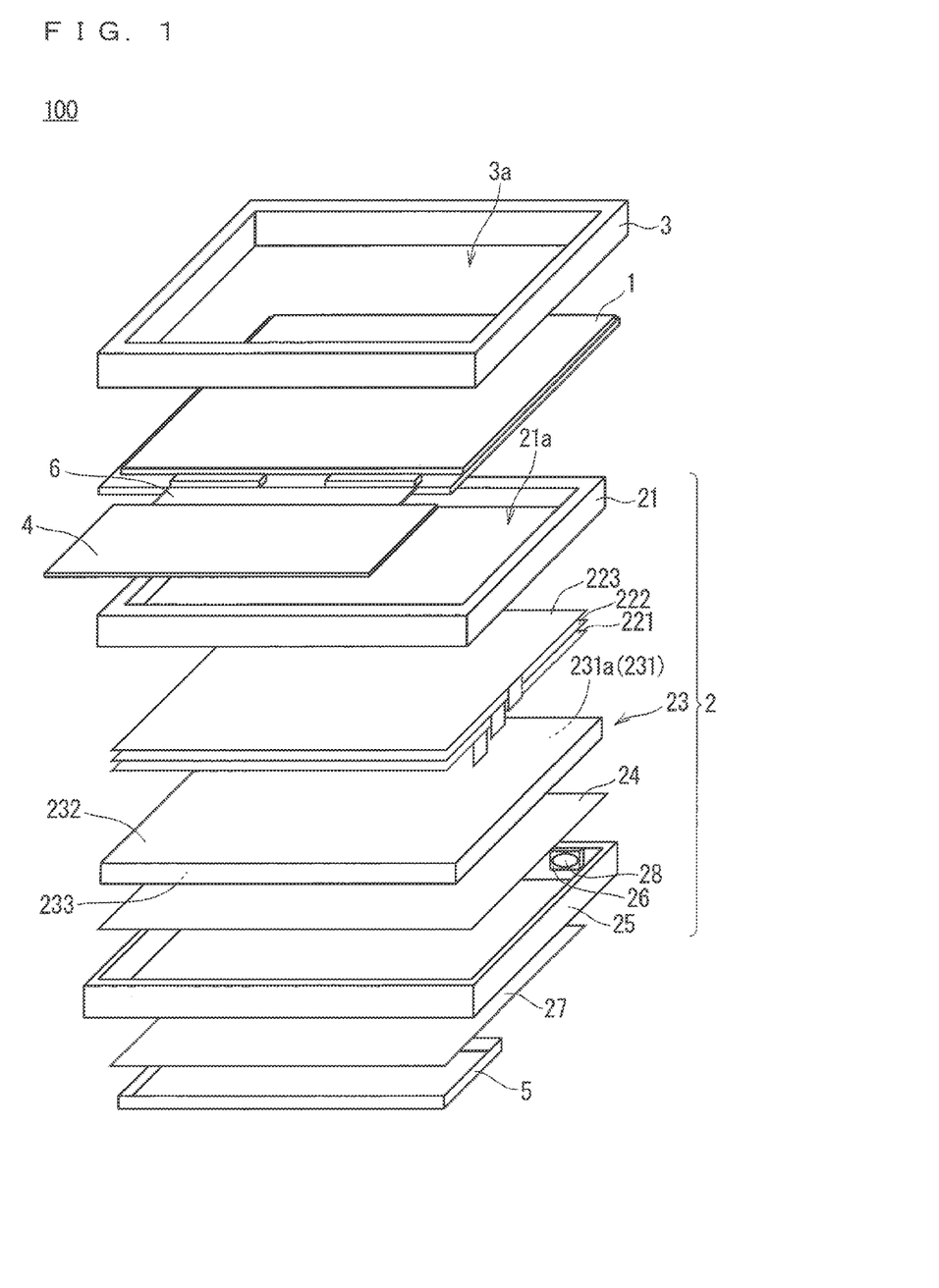
FIG. 1 is an exploded perspective view of a display according to Embodiment 1.

FIG. 1 is an exploded perspective view schematically illustrating an example structure of a display 100 according to Embodiment 1 of the present invention. As illustrated in FIG. 1, the display 100 includes a display panel 1, a light source apparatus 2, a front frame 3, a circuit board 4, a flexible printed circuit (FPC) 6, a protection cover 5, and an insulation sheet 27.

The light source apparatus 2 illuminates the display panel 1 from the back surface side. The display panel 1 displays an image using light emitted from the light source apparatus 2. The display panel 1 and the light source apparatus 2 are disposed in an opening 3a of the front frame 3. The user views the image displayed from the opening 3a on the display panel 1. The circuit board 4 includes circuitry for driving the display panel 1. The circuit board 4 and the display panel 1 are electrically connected via the FPC 6. The front surface of the display panel 1 (i.e., the image display side) may include a touch panel for detecting a position of an operator to be operated on the display surface, and a generally transparent protective material for protecting the touch panel. The constituent components of the display 100 according to Embodiment 1 will be described in more detail.

Structure of Display Panel

Figure 2:
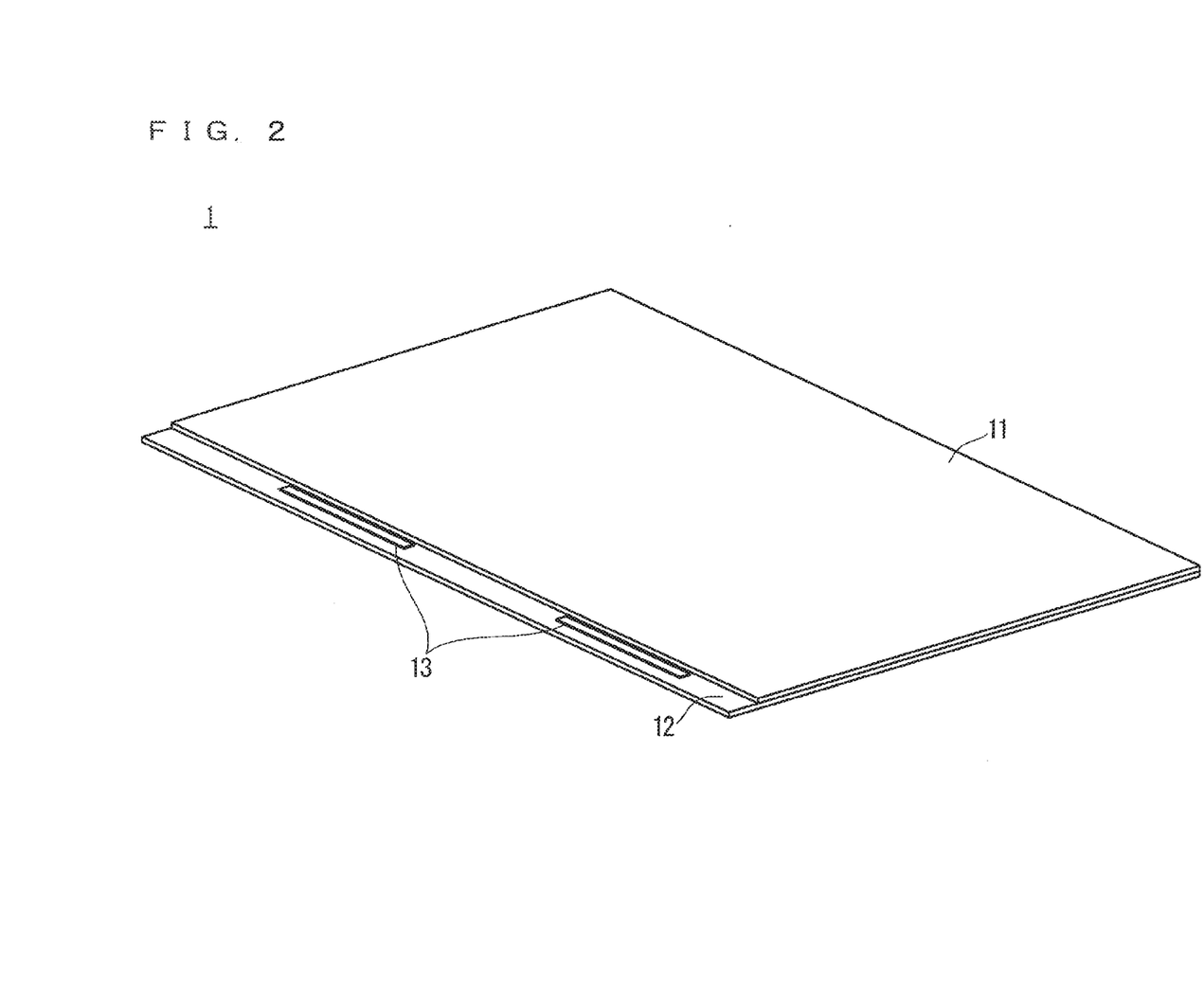
FIG. 2 is a perspective view of a display panel according to Embodiment 1.

The display panel 1 is a transmission or semi-transmission type liquid crystal display panel that displays an image using the birefringence of liquid crystals. FIG. 2 is a perspective view schematically illustrating an example structure of the display panel 1 included in the display 100 according to Embodiment 1 of the present invention. As illustrated in FIG. 2, the display panel 1 includes a first substrate 11, a second substrate 12, and driving integrated circuits (ICs) 13.

The first substrate 11 is obtained by forming, for example, a color filter (CF), a light shield layer, and a counter electrode on an insulating substrate made of glass, etc. The first substrate 11 is referred to as, for example, a "color filter substrate" or a "counter substrate". The second substrate 12 is obtained by forming, for example, a thin film transistor (TFT) functioning as a switching element and a pixel electrode on an insulating substrate made of glass, etc. The second substrate 12 is referred to as, for example, a "TFT substrate" or an "array substrate".

The liquid-crystal display panel 1 further includes a spacer for maintaining the spacing between the first substrate 11 and the second substrate 12, a sealant for sealing the first substrate 11 and the second substrate 12, liquid crystals sandwiched between the first substrate 11 and the second substrate 12, and a sealing material for sealing an injection hole for injecting the liquid crystals. The liquid-crystal display panel 1 further includes two alignment films disposed on the respective inner side surfaces of the first substrate 11 and the second substrate 12 to align the liquid crystals, and two polarizers disposed on the respective outer side surfaces of the first substrate 11 and the second substrate 12.

The driving ICs 13 are disposed on, for example, the outer periphery of the second substrate 12, or a tape carrier package (TCP) or a chip on film (COF) that is a tape-shaped wiring material connected to the outer periphery of the second substrate 12 to drive the TFT. Since the display panel 1 has a general structure of liquid-crystal display panels, the illustration of the constituent components and the detailed description thereof will be partly omitted.

Structure of Light Source Apparatus

The light source apparatus 2 illuminates the display panel 1 from the opposite side (i.e., the second substrate 12 side) that is opposite to the display surface of the display panel 1 on which an image is displayed. As illustrated in FIG. 1, the light source apparatus 2 includes a light source 28, a light source substrate 26, a light guide plate 23, optical sheets 221 to 223, a reflecting plate 24, a middle frame 21, and a rear frame 25.

Examples of the light source 28 include a red-green-blue (three basic colors of RGB) point light source, an LED that emits light with a light emitting color other than the RGB, and a fluorescent tube lamp. The light source 28 is disposed on the light source substrate 26. When the light source 28 is the point light source, a substrate mainly made of a general glass epoxy resin or a flexible flat cable is used as the light source substrate 26. The light source substrate 26 may be a substrate mainly made of a ceramic or a metal such as aluminum to increase heat dissipation of, for example, the light source 28. The light source substrate 26 is bonded to and held by, for example, the light guide plate 23 or the rear frame 25 to be described later.

The light guide plate 23 has an incident surface 231a on which the light emitted from the light source 28 is incident, and a light emitting surface 232 from which the light incident on the incident surface 231a is emitted. In Embodiment 1, one of side surfaces 231 of the light guide plate 23 is the incident surface 231a, and the front surface of the light guide plate 23 is the light emitting surface 232. The light guide plate 23 is transparent, and made of, for example, an acrylic resin, a polycarbonate resin, or glass. At least one of the light emitting surface 232 of the light guide plate 23 and an opposite light emitting surface 233 that is the back surface of the light guide plate 23 and opposite to the light emitting surface 232 has a scattering dot pattern or a prism shape for adjusting intensity distribution and an emission direction of the planar light as well as for emitting light. The light guide plate 23 is fixed to the rear frame 25 with an adhesive material, for example, a double-faced tape or an adhesive.

The optical sheets 221 to 223 are disposed on the light emitting surface 232 of the light guide plate 23 in this order to overlap one another, and optically act on the light emitted from the light emitting surface 232. The optical sheets 221 to 223 are, for example, lens sheets for collecting light, diffusion sheets for homogenizing light, or viewing-angle adjustment sheets for adjusting brightness in a viewing-angle direction, and control intensity distribution and an emission angle of the light emitted from the light emitting surface 232. The optical sheets 221 to 223 are made of a resin such as polycarbonate (PC) or poly ethylene terephthalate (PET). Although Embodiment 1 describes an example using three optical sheets, the optical sheets are disposed as many as necessary depending on the purpose and in the proper order.

The reflecting plate 24 is, for example, sheet-shaped, and is disposed closer to the opposite light emitting surface 233 of the light guide plate 23 to guide the light emitted from the opposite light emitting surface 233 toward the light guide plate 23.

The middle frame 21 is a frame component including an opening 21a for illuminating the display panel 1 using the light emitted from the light emitting surface 232 of the light guide plate 23. The display panel 1 is disposed and held in place around the top surface of the middle frame 21. The middle frame 21 can be made of, for example, a metal such as aluminum, stainless steel, or iron, or a resin such as PC or acrylonitrile butadiene styrene (ABS).

The rear frame 25 is preferably made of a metal with high thermal conductivity to conduct the heat dissipated from the light source 28. Particularly using a housing made of aluminum or an aluminum alloy with high thermal conductivity as the rear frame 25 can efficiently dissipate the heat from the light source 28 to prevent the heat from remaining in the light source apparatus 2.

The middle frame 21 and the rear frame 25 are fixed to each other generally by a chain hook or through screwing to hold, for example, the other constituent components of the light source apparatus 2, the display panel 1, and the circuit board 4.

The front frame 3 is a frame component including the opening 3a, and is formed of, for example, a thin metal plate or a resin. The front frame 3 holds the display panel 1 and the light source apparatus 2. The front frame 3 is fixed to the light source apparatus 2, for example, by a chain stretch or through screwing. The front frame 3 may be formed as a single component, or by combination of a plurality of components. Attachment parts (for example, a screw and an attachment hole) for attaching the display 100 to a final product may be provided on the side surfaces, the front surface, the back surface, or the periphery of the front case 3.

Structure of Circuit Board

The circuit board 4 controls the display panel 1 and the light source 28 according to electric input and output signals. The circuit board 4 generally has a structure in which electrical parts are mounted on the FPC 6 formed by wiring a film substrate connected to the display panel 1. The circuit board 4 may have a structure in which a wiring pattern such as a copper pattern is formed on a substrate made of, for example, glass epoxy and electrical parts are soldered to the surface of the substrate.

In Embodiment 1, the circuit board 4 is disposed on the back surface side of the display 100 (i.e., the back surface of the rear frame 25 to which the light is not emitted) with the display 100 assembled. The protection cover 5 accommodates the circuit board 4 on the back surface side of the display 100, and protects the circuit board 4 from outside pressure or electrostatic damage. The protection cover 5 is made of, for example, a metal such as aluminum, stainless steel, or galvanized sheet iron, or a thin film resin such as PET. The protection cover 5 is fixed, for example, by being inserted into the front frame 3 or screwed into the rear frame 25.

In Embodiment 1, the protection cover 5 is a metallic protection cover, and is also referred to as a "shield metal". When the protection cover 5 is a metallic shield metal, it is preferred to take measures for insulation by bonding the insulation sheet 27 made of a resin such as PET to the back surface of the rear frame 25 to prevent electrical contact of the rear frame 25 with the circuit board 4 and the electrical parts on the circuit board 4. The insulation sheet 27 has, for example, an adhesive material on one surface, and is bonded to, for example, the electrical parts on the circuit board 4.

Structure of Optical Sheets and Position Fixing Method

Figure 3:
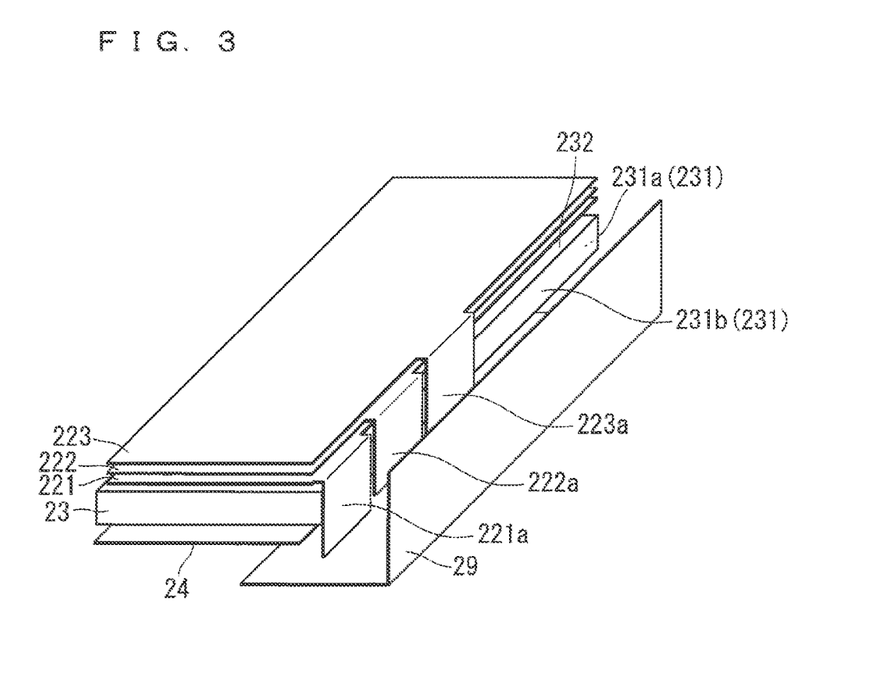
FIG. 3 is a perspective view illustrating a state of fixing positions of optical sheets according to Embodiment 1.
Figure 4:
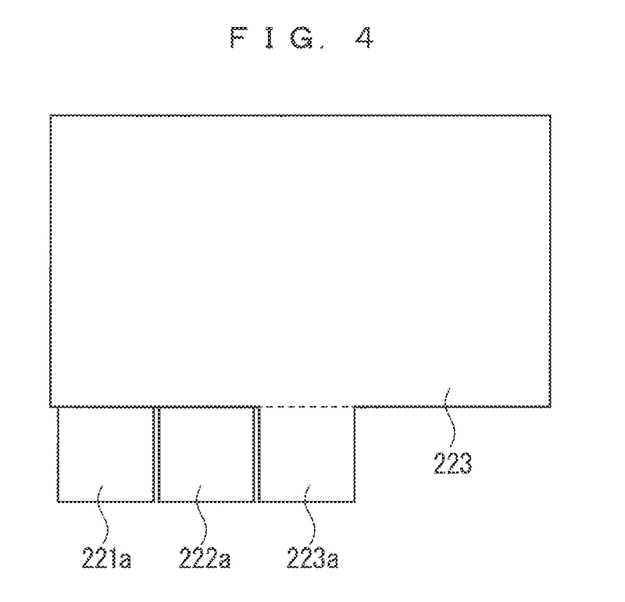
FIG. 4 is a plan view of the optical sheets in a flat state according to Embodiment 1.
Figure 5:
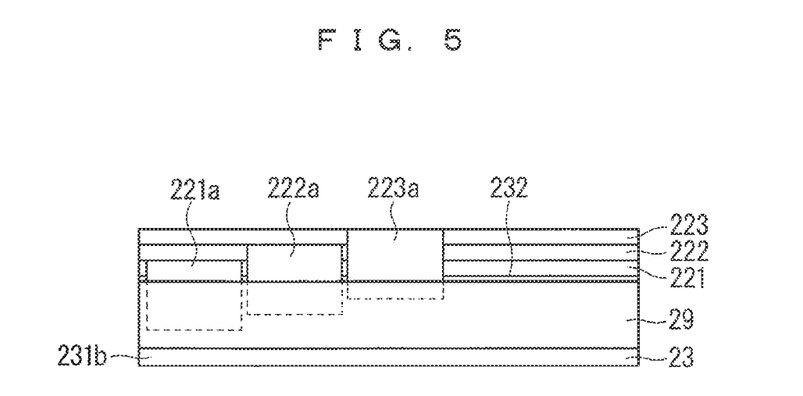
FIG. 5 is a side view illustrating a state of fixing the positions of the optical sheets according to Embodiment 1.
Figure 6:
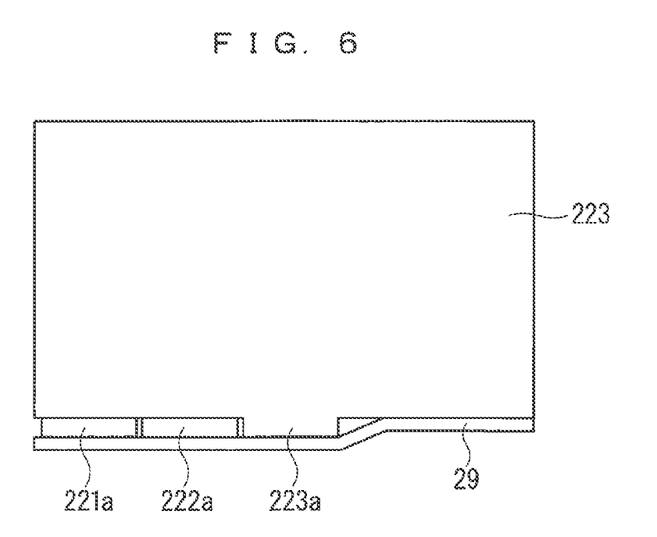
FIG. 6 is a top view illustrating a state of fixing the positions of the optical sheets according to Embodiment 1.

A structure of the optical sheets 221 to 223 and a method of fixing these positions will be hereinafter described in more detail. FIG. 3 is a perspective view schematically illustrating an example state of fixing the positions of the optical sheets 221 to 223 according to Embodiment 1. FIG. 4 is a plan view schematically illustrating example shapes of the optical sheets 221 to 223 in a flat state according to Embodiment 1. FIGS. 5 and 6 are a side view and a top view, respectively, for schematically illustrating the example state of fixing the positions of the optical sheets 221 to 223 according to Embodiment 1.

As illustrated in FIGS. 3 to 6, the optical sheets 221 to 223 have almost the same area as that of the light emitting surface 232 of the light guide plate 23 in a plan view, and include respective extension portions 221a to 223a whose peripheral portions extend outward and which are rectangular. The extension portions 221a to 223a are aligned with displacements so as not to completely overlap one another when the optical sheets 221 to 223 overlap. In Embodiment 1, the extension portions 221a to 223a extend in the same direction, and are aligned with spacing in the same order as the order of overlapping the optical sheets 221 to 223 on the light emitting surface 232 of the light guide plate 23.

As illustrated in FIGS. 3, 5, and 6, the optical sheets 221 to 223 are disposed on the light guide plate 23 with the extension portions 221a to 223a bent at right angles at the roots to face the side surface 231b of the light guide plate 23 from the flat state illustrated in FIG. 4. The bent portion of the extension portion 223a is indicated by a dashed line in FIG. 4. In the example of FIGS. 3, 5, and 6, the extension portions 221a to 223a face a surface 231b that is one of the two side surfaces 231 vertical to the incident surface 231a of the light guide plate 23. The extension portions 221a to 223a are preferably of lengths not to extend off the surface 231b. Although the extension portions 221a to 223a are the same in length in the example of FIGS. 4 and 5, they may have different lengths or may have lengths reaching the same position on the surface 231b.

The positions of the optical sheets 221 to 223 are fixed with the adhesive material 29 applied to the extension portions 221a to 223a. Examples of the adhesive material 29 include an adhesive and a tape. FIGS. 3, 5, and 6 illustrate that the adhesive material 29 is a piece of tape and that the extension portions 221a to 223a are fixed to the surface 231b with the adhesive material 29 that is the piece of tape applied from the opposite side of the surface 231b of the light guide plate 23. When the adhesive material 29 is a double-faced tape or an adhesive, the extension portions 221a to 223a are fixed by disposing the adhesive material 29 inside the extension portions 221a to 223a, that is, between the extension portions 221a to 223a and the surface 231b of the light guide plate 23, which will produce the same advantages.

In Embodiment 1, the extension portions 221a to 223a formed by bending extensions of the peripheral portions of the optical sheets 221 to 223 to face the side surface 231b of the light guide plate 23 are bonded to the surface 231b of the light guide plate 23 with the adhesive material 29, which can prevent misalignment of the optical sheets 221 to 223. The bezel of the light source apparatus 2 can be narrower than when the optical sheets 221 to 223 are fixed by being engaged in the protruding structure or the notch structure of the light guide plate 23 or by taping the top surface of the light guide plate 23.

Since the extension portions 221a to 223a are aligned with spacing so as not to overlap one another, the operator can make sure not to forget about disposing any one of the optical sheets 221 to 223 before sealing the light source apparatus 2 with the rear frame 25 and the middle frame 21.

Since the extension portions 221a to 223a are aligned in the same order as the order of overlapping the optical sheets 221 to 223 on the light emitting surface 232 of the light guide plate 23, the operator can easily verify whether the order of disposing the optical sheets 221 to 223 is correct.

The extension portions 221a to 223a may be aligned so as to overlap partly if not completely. This structure can also produce the same advantages above.

The structure of Embodiment 1 of aligning the extension portions 221a to 223a with spacing so as not to overlap one another is more suitable for narrowing the bezel of the light source apparatus 2 because even when the number of optical sheets are many, the thickness of the extension portions on the surface 231b of the light guide plate 23 is equal to the thickness of one optical sheet.

Embodiment 2

Figure 7:
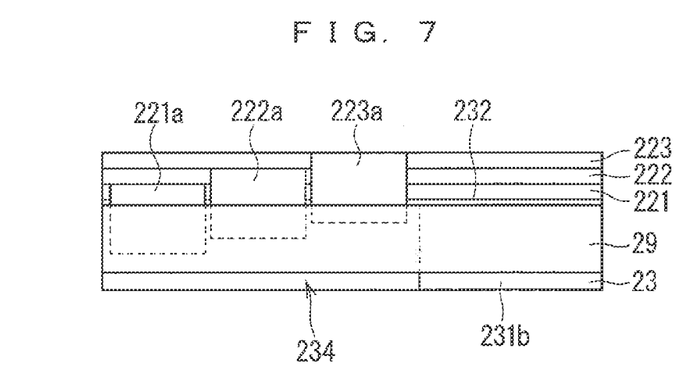
FIG. 7 is a side view illustrating a state of fixing positions of optical sheets according to Embodiment 2.
Figure 8:
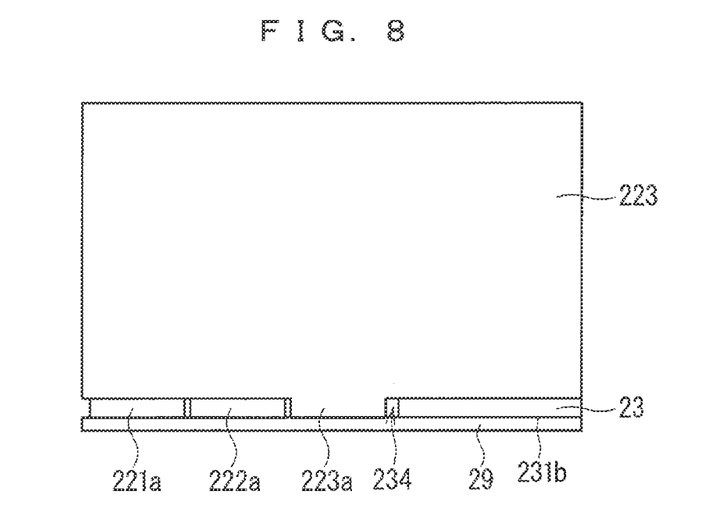
FIG. 8 is a top view illustrating a state of fixing the positions of the optical sheets according to Embodiment 2.

FIGS. 7 and 8 are a side view and a top view, respectively, for schematically illustrating an example state of fixing the positions of the optical sheets 221 to 223 according to Embodiment 2 of the present invention. As illustrated in FIGS. 7 and 8 according to Embodiment 2, the light guide plate 23 includes, in the surface 231b, a side surface recess 234 that is a recess facing the extension portions 221a to 223a. The depth of the side surface recess 234 is preferably identical to each of the thicknesses of the extension portions 221a to 223a, that is, identical to each of the thicknesses of the optical sheets 221 to 223. When the extension portions 221a to 223a have different thicknesses, the side surface recess 234 preferably has a varying depth to match the extension portions 221a to 223a facing the side surface recess 234.

The extension portions 221a to 223a are disposed in the side surface recess 234, and bonded to the surface 231b of the light guide plate 23 with the adhesive material 29 in the same manner as Embodiment 1. The example of FIGS. 7 and 8 illustrates that the adhesive material 29 is a piece of tape and that the extension portions 221a to 223a are fixed to the surface 231b with the adhesive material 29 that is the piece of tape applied from the outside of the extension portions 221a to 223a. Since the display according to Embodiment 2 is identical to the display 100 according to Embodiment 1 except for the shape of the light guide plate 23 and the method of fixing the positions of the optical sheets 221 to 223, the detailed description thereof will be omitted.

The light guide plate 23 according to Embodiment 2 includes, in the surface 231b, the side surface recess 234 that is a recess facing the extension portions 221a to 223a. The extension portions 221a to 223a are disposed in the side surface recess 234 and bonded to the surface 231b with the adhesive material 29. Since the adhesive area between the adhesive material 29 and the surface 231b of the light guide plate 23 increases more than that according to Embodiment 1, the adhesion can be improved.

Since the portion where the extension portions 221a to 223a are disposed is flat-shaped, the stowage of stowing, in the middle frame 21 or the rear frame 25, the light guide plate 23 in which the optical sheets 221 to 223 are disposed can be improved. The advantages of narrowing the bezel by the thicknesses of the extension portions 221a to 223a can be produced more than by Embodiment 1.

Embodiment 3

Figure 9:
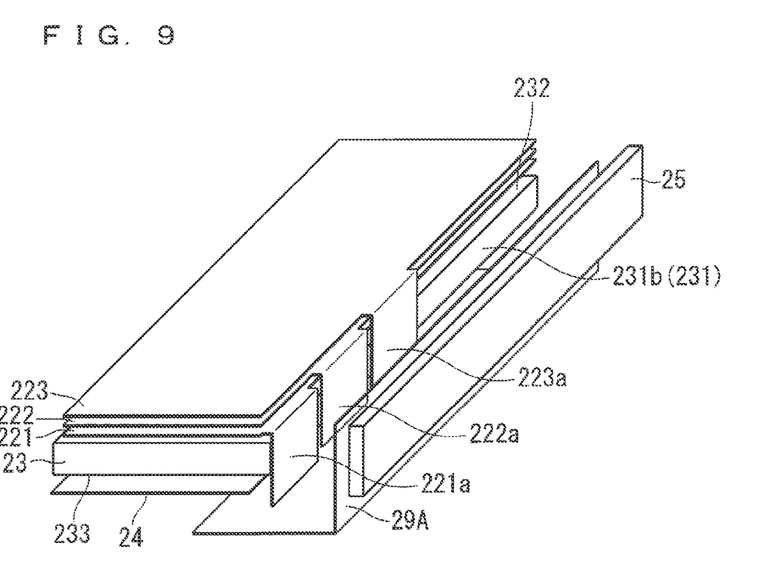
FIG. 9 is a perspective view illustrating a state of fixing positions of optical sheets according to Embodiment 3.

FIG. 9 is a perspective view schematically illustrating an example state of fixing the positions of the optical sheets 221 to 223 according to Embodiment 3 of the present invention. In Embodiment 3, the positions of the optical sheets 221 to 223 are fixed with an adhesive material 29A instead of the adhesive material 29 according to Embodiments 1 and 2. The adhesive material 29A is an adhesive or a double-faced tape, and bonds the extension portions 221a to 223a to the surface 231b of the light guide plate 23 and to the rear frame 25. The example of FIG. 9 illustrates that the adhesive material 29A is a piece of double-faced tape and that one of the adhesive surfaces is bonded to the surface 231b of the light guide plate 23 and the other adhesive surface is bonded to the rear frame 25. Thus, the positions of the optical sheets 221 to 223 are fixed by bonding together the extension portions 221a to 223a, the surface 231b of the light guide plate 23, and the rear frame 25.

The adhesive material 29A may bond the extension portions 221a to 223a to the middle frame 21 as well as to the surface 231b of the light guide plate 23. When the adhesive material 29A is a piece of double-faced tape, the adhesive material 29A may be shaped to be disposed on the opposite light emitting surface 233 side of the light guide plate 23, that is, to face the reflecting plate 24, and bond the reflecting plate 24 to the rear frame 25. Since the display according to Embodiment 3 is identical to the display 100 according to Embodiment 1 except for the structure of the adhesive material 29A and the method of fixing the positions of the optical sheets 221 to 223, the detailed description thereof will be omitted.

Since the adhesive material 29A bonds the extension portions 221a to 223a not only to the surface 231b of the light guide plate 23 but also to the rear frame 25, the advantages of preventing misalignment of the optical sheets 221 to 223 can be more increased. Moreover, the adhesive material 29A can both fix the positions of the optical sheets 221 to 223 and fix the light guide plate 23 to the rear frame 25.

Embodiment 4

Figure 10:
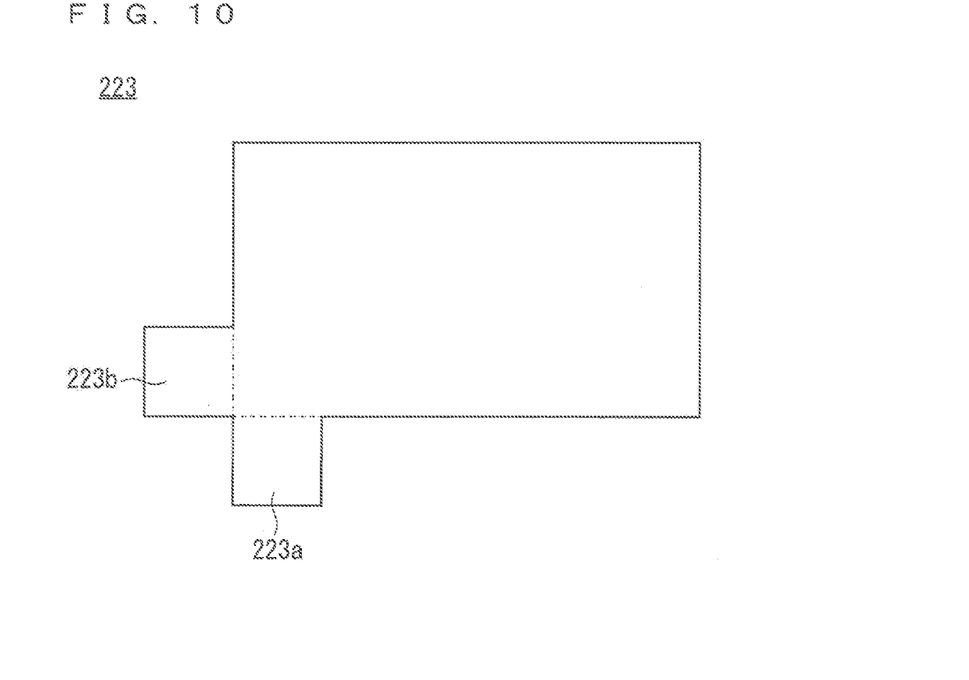
FIG. 10 is a plan view of an optical sheet in a flat state according to Embodiment 4.
Figure 11:
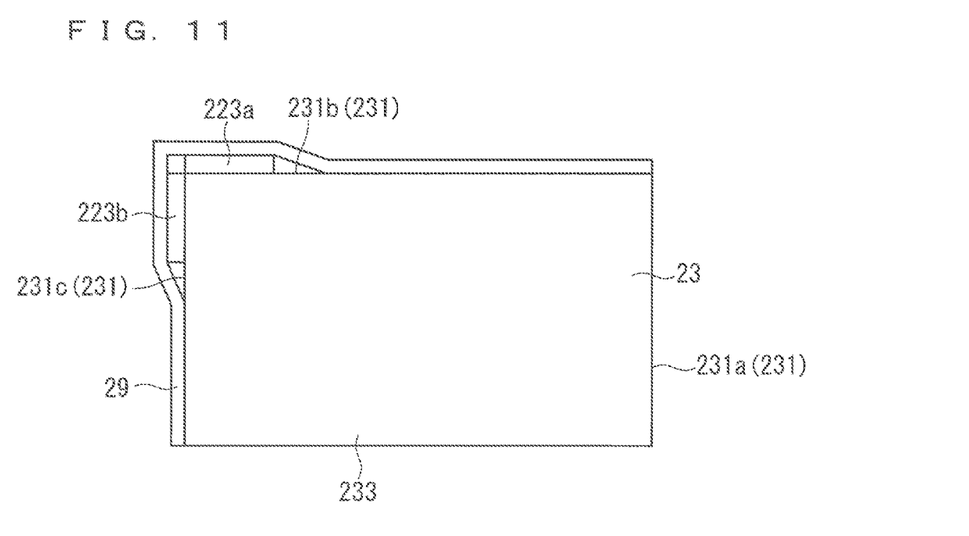
FIG. 11 is a rear view illustrating a state of fixing a position of the optical sheet according to Embodiment 4.

FIG. 10 is a plan view schematically illustrating an example shape of the optical sheet 223 in a flat state according to Embodiment 4 of the present invention. FIG. 11 is a rear view for schematically illustrating an example state of fixing the position of the optical sheet 223 according to Embodiment 4. As illustrated in FIGS. 10 and 11, the optical sheet 223 includes an extension portion 223b in addition to the extension portion 223a according to Embodiment 4.

The extension portion 223b extends from a side orthogonal to the side of the extension portion 223a in the optical sheet 223, and is bent at a right angle at the root to face a surface 231c orthogonal to the surface 231b among the side surfaces 231 of the light guide plate 23. The bent portions of the extension portions 223a and 223b are indicated by dashed lines in FIG. 10. In the example of FIGS. 10 and 11, the extension portions 223a and 223b are disposed closer to one corner of the optical sheet 223.

With the arrangement illustrated in FIG. 11, the adhesive material 29 that is a piece of tape can bond the extension portions 223a and 223b to the surfaces 231b and 231c, respectively, among the side surfaces 231 of the light guide plate 23. Instead of the adhesive material 29, the adhesive material 29A may bond the extension portions 223a and 223b not only to the light guide plate 23 but also to the middle frame 21 or the rear frame 25 similarly as according to Embodiment 3. Since the display according to Embodiment 4 is identical to the display 100 according to Embodiment 1 except for the structure of the optical sheet 223 and the method of fixing the position of the optical sheet 223, the detailed description thereof will be omitted.

Since the optical sheet 223 is fixed to the side surfaces 231 of the light guide plate 23 in two orthogonal directions, misalignment of the optical sheet 223 in a direction of rotation can be prevented. Since the light guide plate 23 is a cuboid, the two side surfaces 231 that face the extension portions 223a and 223b are orthogonal and adjacent to each other. However, when the light guide plate 23 has many more side surfaces, the two side surfaces 231 that face the extension portions 223a and 223b do not have to be orthogonal to each other unless they face each other. In this case, misalignment of the optical sheet 223 in a direction of rotation can also be prevented.

The optical sheet 223 may have at least three extension portions. Although the example above describes only the optical sheet 223, each of the optical sheets 221 and 222 may have at least two extension portions.

Embodiment 5

Figure 12:
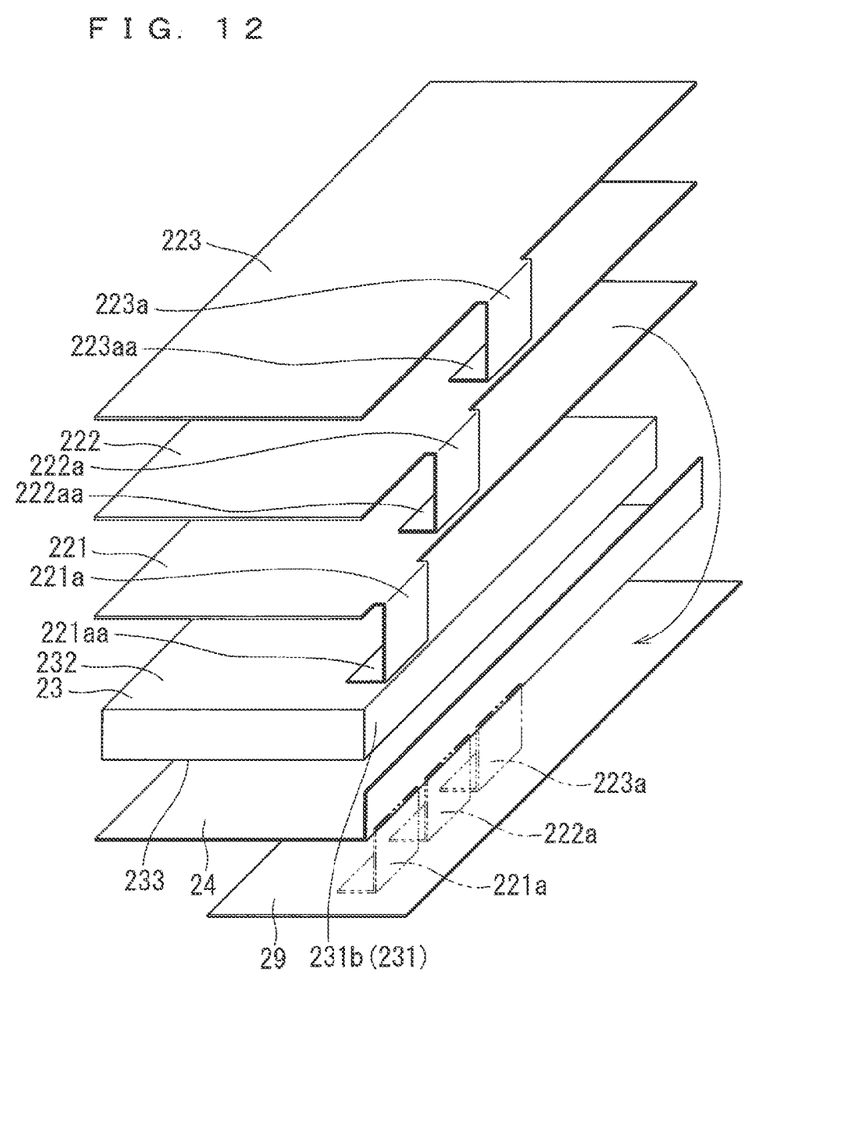
FIG. 12 is an exploded perspective view illustrating a state of fixing positions of optical sheets according to Embodiment 5.

FIG. 12 is an exploded perspective view schematically illustrating an example state of fixing the positions of the optical sheets 221 to 223 according to Embodiment 5 of the present invention. As illustrated in FIG. 12, the extension portions 221a to 223a include respective folded portions 221aa to 223aa that further extend to face the opposite light emitting surface 233 that is the back surface of the light guide plate 23 and opposite to the light emitting surface 232 and are bent at right angles according to Embodiment 5. The positions of the optical sheets 221 to 223 are fixed by applying the adhesive material 29 to the folded portions 221aa to 223aa, respectively, on the back surface side of the light guide plate 23. The example of FIG. 12 illustrates that the adhesive material 29 is a piece of tape and that the positions of the optical sheets 221 to 223 are fixed by applying the adhesive material 29 that is the piece of tape to the folded portions 221aa to 223aa from the back surface side of the light guide plate 23. Since the display according to Embodiment 5 is identical to the display 100 according to Embodiment 1 except for the structure of the optical sheets 221 to 223 and the method of fixing the positions of the optical sheets 221 to 223, the detailed description thereof will be omitted.

In FIG. 12, the positions of the extension portions 221a to 223a are indicated by two-dot chain lines with the optical sheets 221 to 223 arranged. In the example of FIG. 12, the optical sheets 221 to 223 are arranged to wrap the light guide plate 23 and the reflecting plate 24 disposed closer to the opposite light emitting surface 233. The folded portions 221aa to 223aa face the back surface of the reflecting plate 24, and are bonded to the back surface of the reflecting plate 24 with the adhesive material 29. As previously described, the folded portions 221aa to 223aa may be bonded to the rear frame 25 with the adhesive material 29A instead of the adhesive material 29.

Since the positions of the extension portions 221a to 223a are fixed with the adhesive material 29 on the opposite light emitting surface 233 side that is wider than the surface 231b of the side surface 231, the adhesive surface according to Embodiment 5 can be increased more than when the extension portions 221a to 223a are fixed only by the surface 231b. Thus, misalignment of the optical sheets 221 to 223 can be prevented more securely. This structure can also support light source apparatuses in which the light guide plate 23 is thin and a sufficient area cannot be secured in the side surfaces 231 for bonding and fixing the extension portions 221a to 223a.

Embodiment 6

Figure 13:
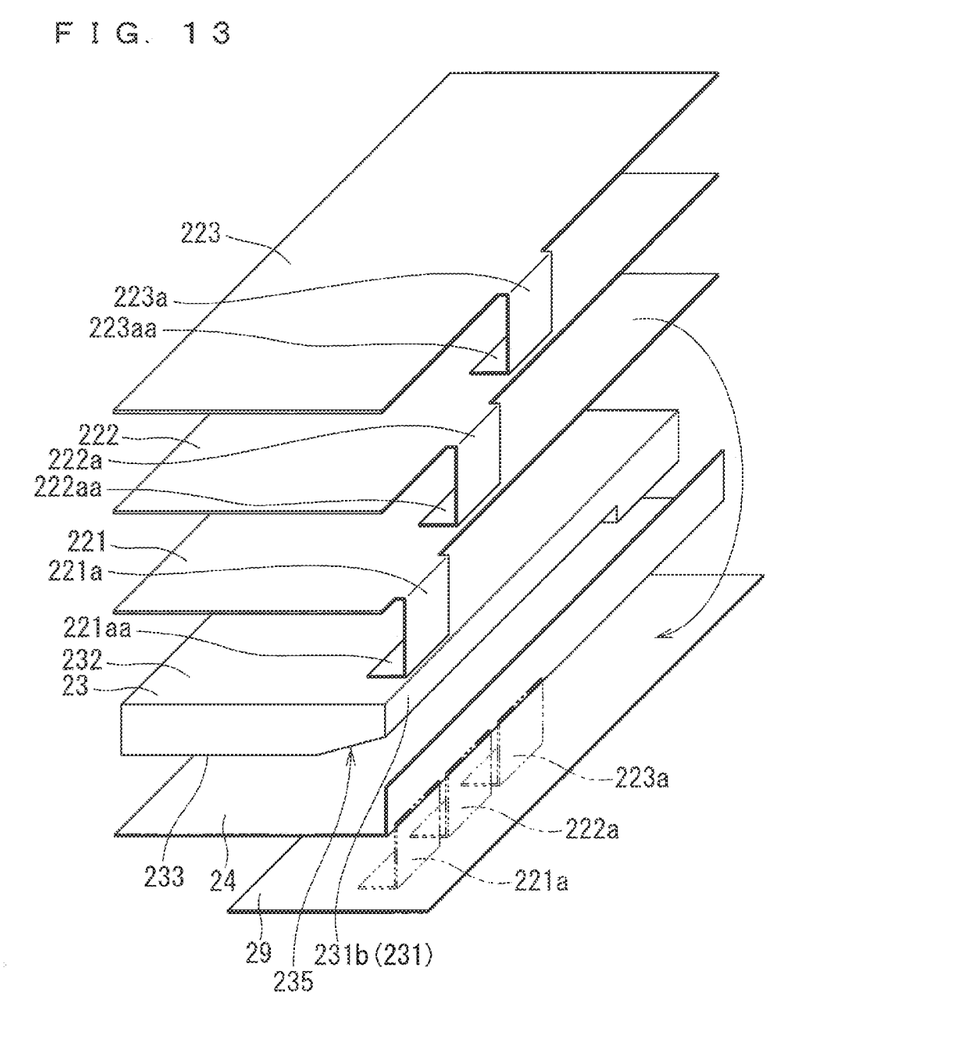
FIG. 13 is an exploded perspective view illustrating a state of fixing positions of optical sheets according to Embodiment 6.

FIG. 13 is an exploded perspective view schematically illustrating an example state of fixing the positions of the optical sheets 221 to 223 according to Embodiment 6 of the present invention. As illustrated in FIG. 13 according to Embodiment 6 and compared to Embodiment 5, the light guide plate 23 includes, in the opposite light emitting surface 233, a back surface recess 235 that is a recess facing the folded portions 221aa to 223aa. In the example of FIG. 13, the back surface recess 235 is wedge shaped at a portion facing the folded portions 221aa to 223aa. Since the display according to Embodiment 6 is identical to the display 100 according to Embodiment 1 except for the shape of the light guide plate 23 and the method of fixing the positions of the optical sheets 221 to 223, the detailed description thereof will be omitted.

The depth of the back surface recess 235 is preferably identical to each of the thicknesses of the folded portions 221aa to 223aa, that is, identical to each of the thicknesses of the optical sheets 221 to 223. When the folded portions 221aa to 223aa have different thicknesses, the back surface recess 235 preferably has a varying depth to match the thicknesses of the folded portions 221aa to 223aa facing the back surface recess 235.

In FIG. 13, the extension portions 221a to 223a are indicated by two-dot chain lines with the optical sheets 221 to 223 arranged. In the example of FIG. 13, the optical sheets 221 to 223 are arranged to wrap the light guide plate 23 and the reflecting plate 24 disposed closer to the opposite light emitting surface 233. The reflecting plate 24 is bent along the back surface recess 235. The folded portions 221aa to 223aa are disposed in the back surface recess 235 via the reflecting plate 24, and are bonded to the back surface of the reflecting plate 24 with the adhesive material 29. As previously described, the folded portions 221aa to 223aa may be bonded to the rear frame 25 with the adhesive material 29A instead of the adhesive material 29.

According to Embodiment 6, the light guide plate 23 includes, in the opposite light emitting surface 233, the back surface recess 235 that is a recess facing the folded portions 221aa to 223aa, and the folded portions 221aa to 223aa are disposed in the back surface recess 235 and bonded with the adhesive material 29. Since the portion where the folded portions 221aa to 223aa are disposed is flat-shaped, interference with, for example, the rear frame 25 hardly occurs and the light source apparatus 2 can be slimmed down.

Embodiment 7

Figure 14:
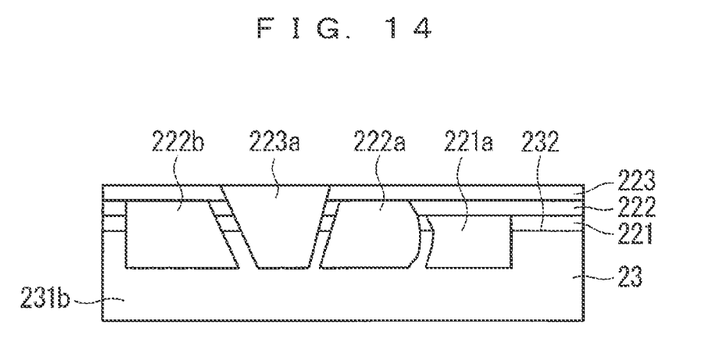
FIG. 14 is a side view illustrating optical sheets and a light guide plate according to Embodiment 7.

FIG. 14 is a side view illustrating the optical sheets 221 to 223 and the light guide plate 23 according to Embodiment 7 of the present invention. The extension portions 221a to 223a and 222b are not rectangular but, for example, trapezoidal, inverted trapezoidal, or elliptic. Each of the extension portions 221a to 223a and 222b has at least a sloped side or an arc-shaped side in the extending direction. The adjacent two extension portions that are arranged side by side have shapes fitting together. The extension portions 221a to 223a and 222b preferably have different shapes from each other. Since the display according to Embodiment 7 is identical to the display 100 according to Embodiment 1 except for the shapes of the extension portions 221a to 223a and 222b, the detailed description thereof will be omitted.

Since adjacent two extension portions of the extension portions 221a to 223a and 222b have shapes fitting together according to Embodiment 7, the operator can more easily verify whether the order of disposing the optical sheets 221 to 223 is correct or make sure not to forget about disposing any one of the optical sheets 221 to 223, by checking the shapes of the extension portions 221a to 223a and 222b.

Specifically, the side of the extension portion 221a closer to the extension portion 222a is arc-shaped to be depressed against the extension portion 222a. Conversely, the side of the extension portion 222a closer to the extension portion 221a is arc-shaped to protrude toward the extension portion 221a. In other words, the extension portions 221a and 222a have shapes fitting together so that these two sides fit together. However, the side of the extension portion 223a closer to the extension portions 221a and 222a is sloped to fit the side of the extension portion 222a closer to the extension portion 223a, and does not fit the side of the extension portion 221a closer to the extension portion 223a. Thus, the operator can easily make sure, in disposing the optical sheets 221 to 223, to arrange the extension portions 221a and 222a side by side, that is, dispose the optical sheet 222 next to the optical sheet 221.

Embodiments can be freely combined, and appropriately modified or omitted within the scope of the invention. While the invention has been shown and described in detail, the foregoing description is in all aspects illustrative and not restrictive. It is therefore understood that numerous modifications and variations can be devised without departing from the scope of the invention.

What is claimed is:

1. A light source apparatus, comprising
   a light source;
   a light guide plate having an incident surface on which light emitted from said light source is incident, and a light emitting surface from which said light incident on said incident surface is emitted;
   a plurality of optical sheets disposed to overlap one another on said light emitting surface, said plurality of optical sheets optically acting on said light emitted from said light emitting surface; and
   an adhesive material for fixing positions of said plurality of optical sheets,
   wherein said plurality of optical sheets include respective extension portions each formed by bending an extension of a peripheral portion of said optical sheet to face a side surface of said light guide plate, and
   said respective extension portions of said plurality of optical sheets are aligned with displacements so as not to completely overlap one another, and said adhesive material is applied to said respective extension portions.

2. The light source apparatus according to claim 1, wherein said adhesive material bonds said respective extension portions to said side surface of said light guide plate.

3. The light source apparatus according to claim 1, wherein said light guide plate includes, in said side surface, a side surface recess that is a recess facing said respective extension portions.

4. The light source apparatus according to claim 1, further comprising
   a frame holding said light guide plate,
   wherein said adhesive material bonds said frame to said respective extension portions.

5. The light source apparatus according to claim 1, wherein at least one of said plurality of optical sheets includes at least two extension portions facing at least two surfaces of said light guide plate, said adhesive material being applied to said at least two extension portions, said at least two surfaces not facing each other.

6. The light source apparatus according to claim 1, wherein said respective extension portions of said plurality of optical sheets extend and are folded to face a back surface of said light guide plate to form folded portions, and said adhesive material is applied to said respective extension portions closer to said back surface, said back surface being opposite to said light emitting surface.

7. The light source apparatus according to claim 6, wherein said light guide plate includes, in said back surface, a back surface recess that is a recess lacing said folded portions of said plurality of optical sheets.

8. The light source apparatus according to claim 1, wherein said respective extension portions of said plurality of optical sheets are aligned in an order identical to an order of aligning said plurality of optical sheets on said light emitting surface.

9. The light source apparatus according to claim 8, wherein said respective extension portions of said plurality of optical sheets are aligned with spacing, and two adjacent extension portions of said respective extension portions have shapes fitting together.

10. A display, comprising:
    said light source apparatus according to claim 1; and
    a display panel displaying an image using light from said light source apparatus.

* * * * *